United States Patent
Cant

[19]

[11] Patent Number: 6,164,478
[45] Date of Patent: *Dec. 26, 2000

[54] DISPOSABLE CUTTING BOARD

[75] Inventor: Joseph R. Cant, Naples, Fla.

[73] Assignee: The Tradewell Group, Inc., Naples, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 09/099,737

[22] Filed: Jun. 18, 1998

Related U.S. Application Data

[60] Provisional application No. 60/050,131, Jun. 18, 1997.

[51] Int. Cl.⁷ .......................................................... B65D 6/18
[52] U.S. Cl. ............................ 220/62.1; 220/6; 220/62.2; 269/289 R
[58] Field of Search .................................. 220/6, 62, 62.1, 220/480, 481, 62.11, 62.13, 62.19, 62.2, 62.22; 269/289 R, 302.1

[56] References Cited

U.S. PATENT DOCUMENTS

| | | |
|---|---|---|
| 1,212,040 | 1/1917 | Fletcher . |
| 1,922,399 | 8/1933 | Schilling ................................ 229/186 |
| 1,952,375 | 3/1934 | Johnson . |
| 2,778,324 | 1/1957 | Mattson . |
| 4,719,913 | 1/1988 | Merwin . |
| 5,085,416 | 2/1992 | Miyake et al. . |
| 5,203,548 | 4/1993 | Sanders ................................ 269/302.1 |
| 5,217,159 | 6/1993 | Calvert et al. ........................ 229/186 |
| 5,386,978 | 2/1995 | Ladwig . |
| 5,405,043 | 4/1995 | Meloney ................................ 220/481 |
| 5,472,790 | 12/1995 | Thompson . |
| 5,597,104 | 1/1997 | Elliott ................................... 224/411 |
| 5,727,686 | 3/1998 | Kristal ................................ 206/459.1 |

FOREIGN PATENT DOCUMENTS

| | | | |
|---|---|---|---|
| 1530450 | 6/1968 | France ................................ 229/186 |
| 2646766 | 5/1989 | France . |
| 2678583 | 1/1993 | France ................................ 229/186 |
| 2809946 | 9/1979 | Germany . |
| 564617 | 3/1993 | Japan . |
| 480229 | 12/1969 | Switzerland ......................... 229/186 |

*Primary Examiner*—Stephen Castellano
*Attorney, Agent, or Firm*—Howard & Howard

[57] ABSTRACT

A disposable cutting board assembly (10) having an inner cutting surface (12), a plurality of peripheral outer borders (14) each including an exterior edge (16), and a plurality of corners (18). A plurality of peripheral score lines (20) separate the outer borders (14) from the inner cutting surface (12). The outer borders (14) and the corners (18) are foldable between a first position with the outer borders (14) and the corners (18) in a substantially horizontal position and a second position with the outer borders (14) and the corners (18) in a substantially vertical position. The folding of the outer borders (14) and corners (18) creates a transport tray (10) having an impervious and continuous exterior wall surrounding the inner cutting surface (12). The disposable cutting board assembly (10) also includes a number of partially die cut indicia (30) disposed along one of the outer borders (14). The indicia (30) may be rotated along a living hinge (32) to convey a particular message to a user of the cutting board (10).

26 Claims, 8 Drawing Sheets

DISPOSABLE CUTTING BOARD

RELATED APPLICATION

This patent application claims priority to and all the benefits of U.S. Provisional Patent Application Ser. No. 60/050,131 filed on Jun. 18, 1997 and entitled "Disposable Cutting Board".

TECHNICAL FIELD

The subject invention relates to a single use disposable cutting board. More specifically, the subject invention relates to a disposable cutting board assembly having a number of score lines such that a portion of the cutting board assembly may be folded to contain potentially pathogenic juices of red meat, fish, or poultry and also to create a more rigid transportable serving tray.

BACKGROUND OF THE INVENTION

Cutting surfaces available in a household or commercial kitchen have a number of known deficiencies which limit their use in food preparation. Plastic, Formica, and wood kitchen counter tops may be damaged or marred by preparing food on their surfaces. Ceramic and metal counter tops may dull the cutting knife or other utensil and may also be damaged. Accordingly, most household and commercial kitchens utilize separate or individual cutting boards for preparing food products. These cutting boards, however, also have a number of deficiencies.

Wood and rigid plastic cutting boards are well known in the art. Wood cutting boards typically utilize a ginkgo, willow, or hinoki (white cedar) wood material. The plastic or synthetic cutting boards typically utilize a nitrile butadiene rubber (NBR) or a polyethylene butadiene rubber material. Some of the drawbacks to wood and plastic cutting boards are that they can be hard to clean, can stain, can retain odors, and are too heavy or too large. Also, wood and plastic have sufficient porosity such that the knife or other utensil can form small grooves and cuts within the cutting board.

This porosity and these cuts can harbor bacteria which is likely to breed and propagate. Typically, organisms such as enteric bacteria, i.e., Enterobacteriaceae, such as Salmonella and *E. coli,* and Gram positive organisms, such as Staphylococcus and Streptococcus, are the organisms that can be found in cutting boards. These organisms are transferred to the cutting boards by the food product itself or the liquid juices produced from the food product.

These microorganisms are generally present in the colon, intestines, or fecal matter of humans or animals. When food products such as poultry, red meat, seafood, eggs, or any foods which contain these products come into contact with fecal matter during handling or processing, the potential exists for contamination and subsequent transfer of these organisms to the end users or consumers, i.e., humans.

Not only can the presence of sufficient numbers of microorganisms cause the deterioration of a food product such as by causing spoilage, additionally, if consumed by a human or animal, can also cause disease. In the United States alone, the number of cases of food poisoning associated with the consumption of contaminated food products is conservatively estimated to be in the multimillions per year. While most human cases of bacterial food poisoning only result in acute symptomatic disease, which includes nausea, vomiting, diarrhea, chills, fever, and exhaustion; for those individuals such as infants, the elderly, pregnant women, neonates, and those with immunocompromised systems, death can occur.

The total economic loss attributable to bacterial food poisoning has been estimated to reach into the hundreds of millions of dollars each year due to lost productivity, increased use of the medical insurance system, and increased use of the medical provider system.

Some recent recommendations as to reducing the possibility of bacterial contamination are to continuously disinfect the cutting board or only prepare the bacterial causing food after other food has been prepared. These procedures are not completely effective and can be substantially time consuming. In addition, few people either know how to adequately sanitize their cutting boards, or take the time to do it.

A number of additional solutions have been contemplated by the prior art. One such solution is to have a number of plastic layers or resin coated wood strips stacked and mounted to each other to form a large thick cutting board. When the top layer or strip of material is no longer useable, the user simply peals or pries this layer off to expose the second layer or strip. French patent no. 2,646,766 and Japanese patent no. 5-64617 are typical of this type of prior art design. U.S. Pat. No. 5,085,416 discloses another prior art design which includes a cutting board having an organic polymer layer containing an antibacterial zeolite. The bacteria are killed when it comes into contact with the antibacterial zeolite. These cutting boards, however, can be difficult and costly to manufacture as well as inconvenient for the user. Consumers may also have an aversion to bringing food items into contact with antibacterial agents. Further, none of the contemplated prior art designs include a portion of the cutting board which is designed to contain pathogenic juices or is moveable to create a transportable serving tray.

SUMMARY OF THE INVENTION AND ADVANTAGES

The subject invention includes a single use disposable cutting board assembly comprising an inner cutting surface, a plurality of peripheral outer borders each including an exterior edge, and a plurality of corners. The assembly is characterized by a plurality of peripheral score lines separating the outer borders from the inner cutting surface. The outer borders and the corners are foldable between a first position with the outer borders and the corners in a substantially horizontal position and a second position with the outer borders and the corners in a substantially vertical position to create an impervious and continuous exterior wall surrounding the inner cutting surface. The disposable cutting board assembly further includes at least one partially die cut indicia disposed along at least one of the outer borders wherein the indicia may be manipulated to convey a particular message to a user of the cutting board.

The subject invention also includes a method of creating a transport tray from a disposable cutting board having an inner cutting surface, a plurality of outer borders, a plurality of corners, and a plurality of peripheral score lines separating the inner cutting surface from each of the adjacent outer borders, the method comprising the steps of; folding a first outer border along its adjacent score line from a substantially horizontal position to a substantially vertical position; folding a second outer border along its adjacent score line from a substantially horizontal position to a substantially vertical position; and manipulating a corner between the first and second outer borders such that the corner and first and second outer borders create an impervious and continuous upstanding wall surrounding the inner cutting surface.

Accordingly, the subject invention is a disposable cutting board which can be manipulated to create a transportable serving tray. The cutting board of the subject invention helps prevent the transfer of bacteria and is inexpensive and easily manufactured.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
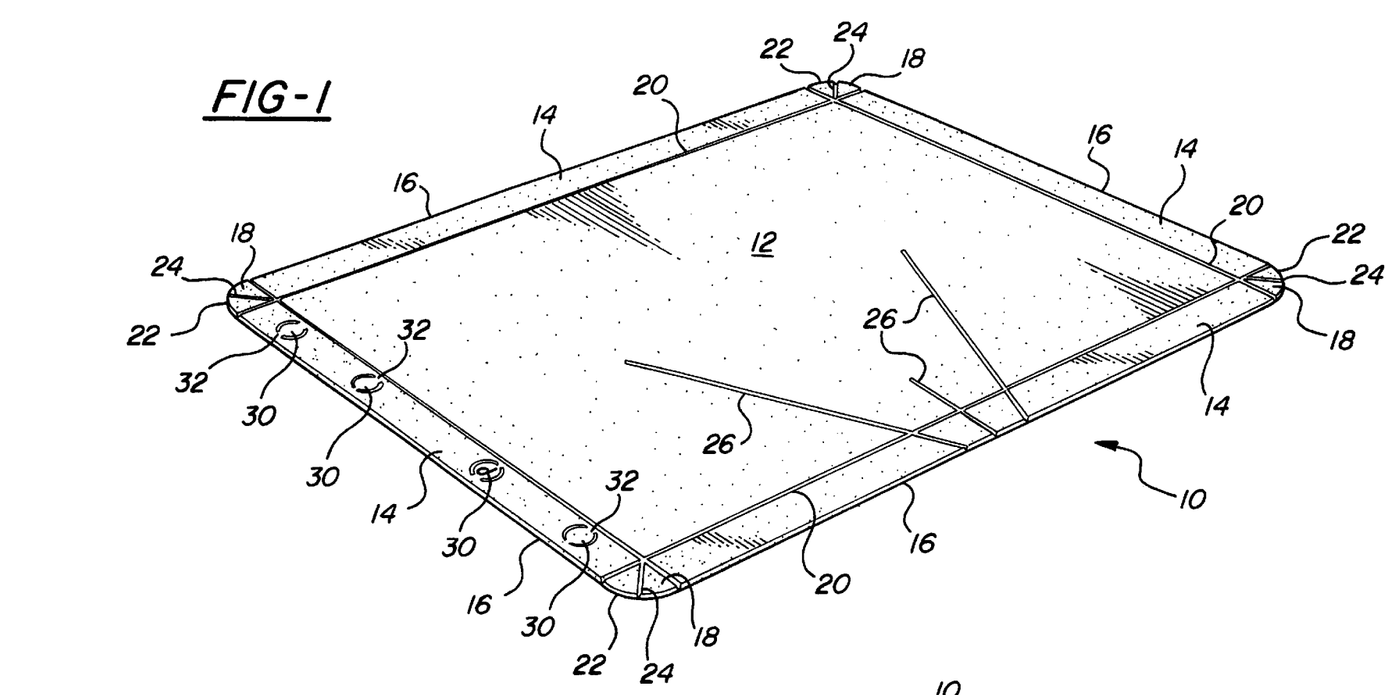
FIG. 1 is a perspective view of the subject invention.
Figure 1A:
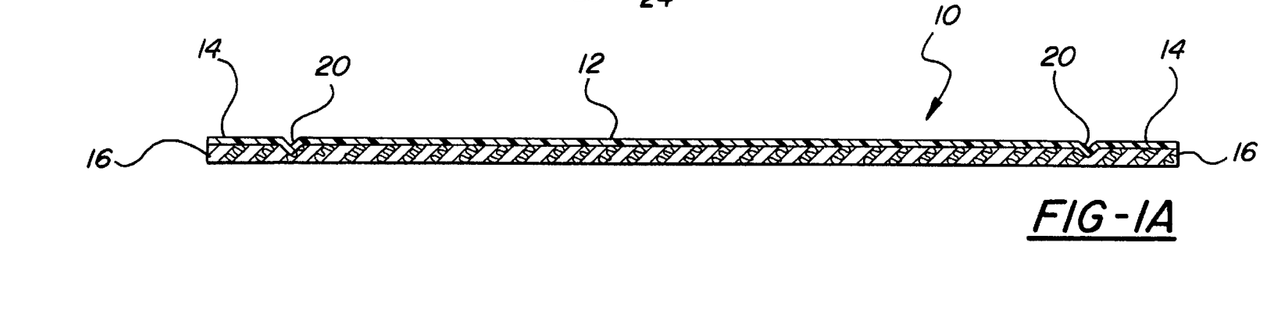
FIG. 1A is a cross-sectional view of the subject invention.
Figure 2:
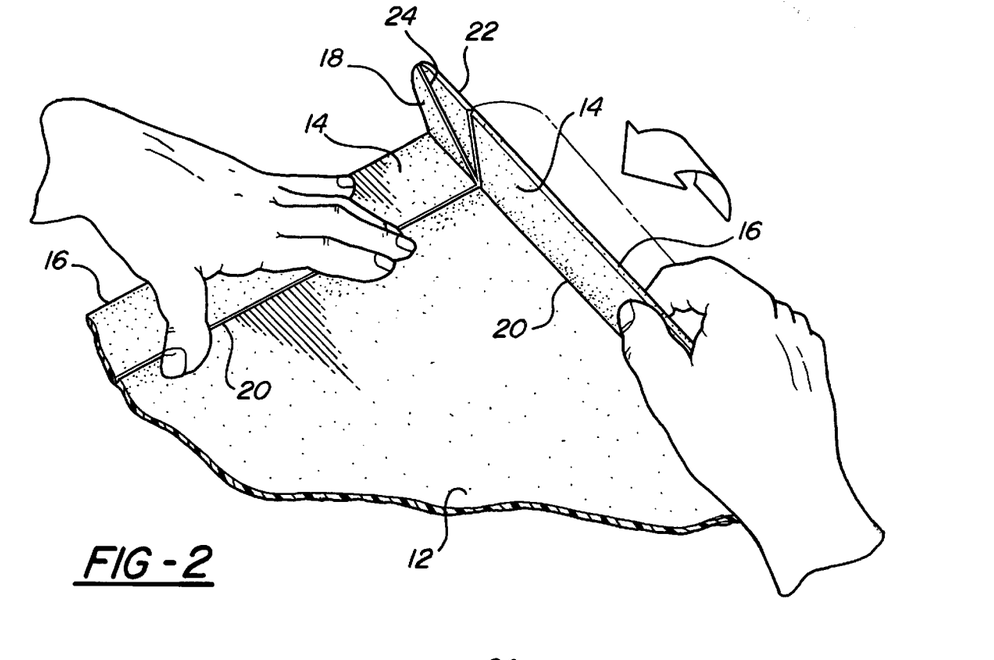
FIG. 2 is a partially cross-sectional perspective view of a user folding an outer border of the subject invention.
Figure 3:
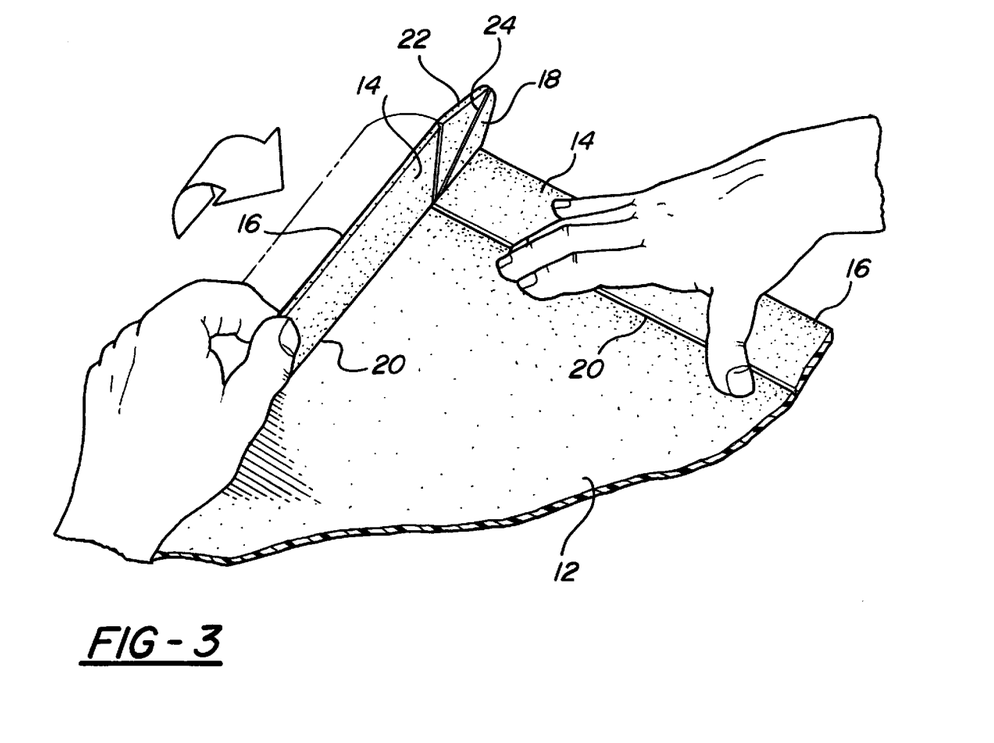
FIG. 3 is a partially cross-sectional perspective view of a user folding another outer border of the subject invention.

Referring to the Figures, wherein like numerals indicate like or corresponding parts throughout the several views, a disposable cutting board assembly is generally shown at 10. As best shown in FIG. 1, the cutting board assembly 10 comprises an inner cutting area or surface 12, a plurality of peripheral outer borders 14 each including an exterior edge 16, and a plurality of corners 18. The assembly is characterized by a plurality of peripheral score lines 20 separating the outer borders 14 from the inner cutting surface 12.

The peripheral score lines 20 separate the corners 18 from the outer borders 14 and the inner cutting surface 12. In other words, each of the peripheral score lines 20 extends along the entire length of the cutting board 10. Specifically, the peripheral score lines 20 extend substantially parallel with the exterior edge 16 of the outer borders 14 such that the outer borders 14 have a substantially uniform width. Preferably, the corners 18 interconnect the outer borders 14. Each of the corners 18 include a curved exterior edge 22. A corner score line 24 extends from the inner cutting surface 12 through a center of each of the corners 18 to the curved exterior edge 22.

In the preferred embodiment, the inner cutting surface 12 is substantially rectangular. The outer borders 14 extend along each side of the substantially rectangular inner cutting surface 12 such that the outer borders 14 are also substantially rectangular. This configuration creates four outer borders 14 and four adjacent corners 18. As appreciated by those skilled in the art, the cutting surface 12 and/or outer borders 14 may be of any suitable design or configuration. Further, there may be any number of outer borders 14 and corners 18 as necessary to completely surround the inner cutting surface 12.

As shown in FIGS. 2 through 5A, the outer borders 14 and the corners 18 are foldable between a first position with the outer borders 14 and the corners 18 in a substantially horizontal position and a second position with the outer borders 14 and the corners 18 in a substantially vertical position to create an impervious and continuous exterior wall surrounding the inner cutting surface 12. In other words, the inner cutting surface 12, outer borders 14, and corners 18 create a transport tray 10 as best shown in FIG. 6. The impervious exterior wall creates a containment area such that any product or liquids are maintained on the inner cutting surface 12. This is especially useful during the movement of the transport tray 10. The specific folding operations will be discussed in greater detail hereinbelow.

The inner cutting surface 12, the peripheral outer borders 14, and the corners 18 are integrally formed of a single homogeneous sheet of material. This sheet of material is preferably made of a semi-rigid cut-resistant paper which may or may not be plastic coated. Specifically, the semi-rigid paper contemplated is a 18 point white paper which is commonly known in the art as bleach board. The plastic coating is a polyethylene coating applied to the paper during the milling process. As appreciated by those skilled in the art, the specific type of material may be of any suitable design, type, thickness, or weight or have any suitable type of coating. Another suitable material could be recyclable plastic. Preferably, a number of cutting boards 10 would be sold in a single package, i.e., a 10-pack or 20-pack. In addition, the cutting boards 10 may be sold in pads like writing pads, or the like, and detached from the pad one at a time.

Figure 12:
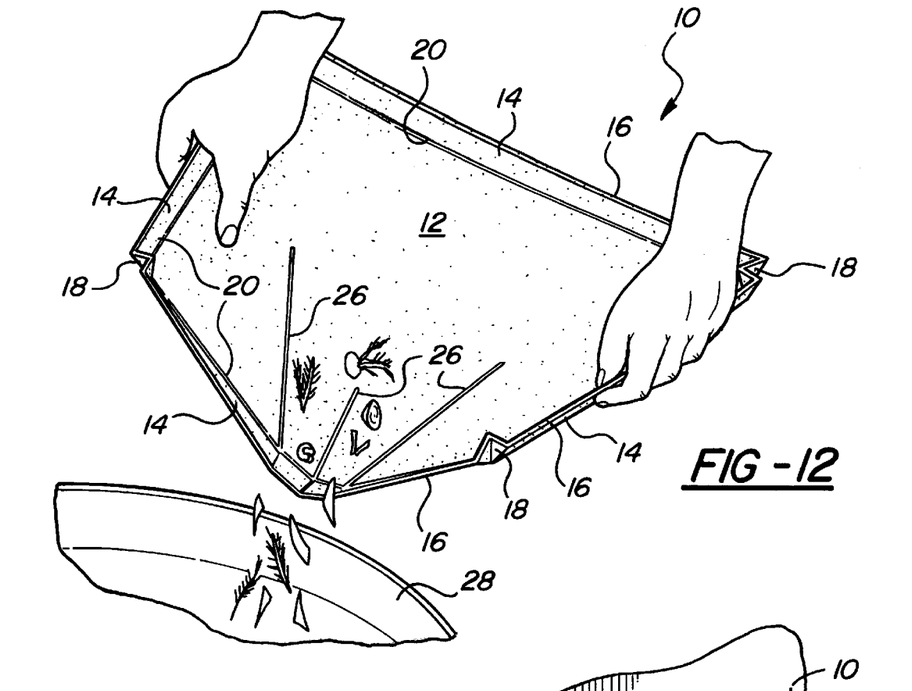
FIG. 12 is a perspective view of a user bending the subject invention along a number of internal score lines.
Figure 13:
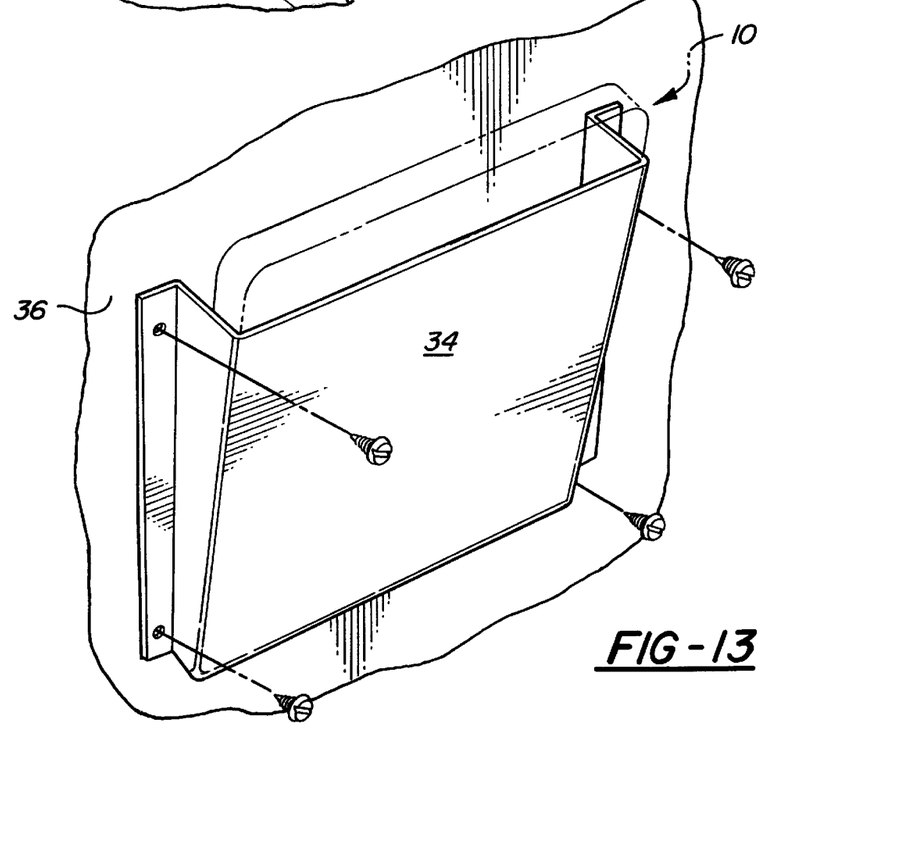
FIG. 13 is a perspective view of a door dispenser for retaining the subject invention.

Referring to FIGS. 1, 6, and 12, the cutting board assembly 10 also includes at least one internal score line 26 extending at least partially through the inner cutting surface 12 and into one of the outer borders 14 to the exterior edge 16 for bending the inner cutting surface 12 of the cutting board 10 along the internal score line 26. Specifically, the internal score line 26 intersects at least one of the peripheral score lines 20. The internal score lines 26 may extend across any one of the outer borders 14, a number of outer borders 14 or through one of the corners 18 without deviating from the scope of the subject invention. In other words, the internal score lines 26 can extend in different directions and even cross over each other.

For illustrative purposes, there are three internal score lines 26 shown in the Figures. One of the score lines 26 extends along the center of the inner cutting surface 12 and the others radiate outwardly toward the adjacent outer borders 14 of the cutting board 10. To utilize the internal score lines 26 a user grasps two of the outer borders 14 and then bends the inner cutting surface 12 along the internal score line 26 which creates a funnel like shape. Any item disposed within the inner cutting surface 12 may now be poured into a soup pan, garbage can 28 or any other desired receptacle as shown in FIG. 12.

Referring to FIGS. 1, 6, and 9 through 11, the cutting board assembly 10 further includes at least one partially die cut panel 30 disposed along at least one of the outer borders wherein the panel 30 may be manipulated to convey a particular message to a user of the cutting board 10. The inner cutting surface 12 and peripheral outer borders 14 have a top surface and a bottom surface. A different indicia is disposed on the bottom surface of each panel 30 with the panel 30 at least partially concealing the indicia from a user. The plastic coating is disposed on the top surface of each panel 30. The indicia conveys the particular message of the indicia to the user. As discussed above, the panel 30 is manipulatable to convey one of the indicia, or message, to the user of the cutting board 10. In the preferred embodiment, the die cut panel 30 is substantially circular and includes a living hinge portion 32 for retaining the panel 30 within the corresponding outer border 14. In particular, the panels 30 include two (2) semi-circular diametrically opposed cuts disposed within the outer border 14. The semi-circular cuts define the living hinge portions 32. As discussed above, preferably the indicia are printed on the bottom surface of the outer border 14. The bottom surface of the outer border 14 is shown best in FIGS. 9 through 11. To make use of the panel 30, a user rotates the circular panel 30 about the living hinges 32 such that the underneath indicia, or message, faces the top surface of the cutting board 10 as shown in FIG. 1. Specifically, the panel 30 with the indicia having the letter P (for poultry) is shown rotated and facing the top surface of the cutting board 10.

Figure 9:
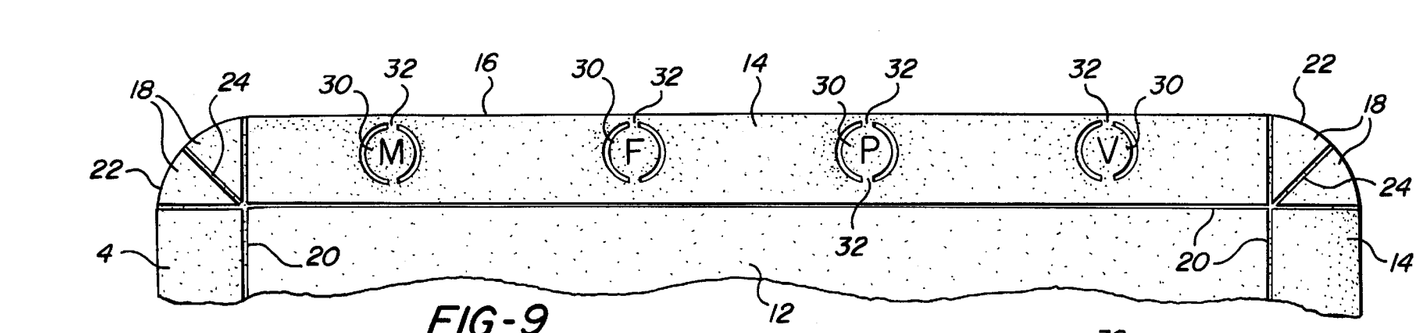
FIG. 9 is a planar view of the outer border having a number of partially die cut indica.
Figure 10:
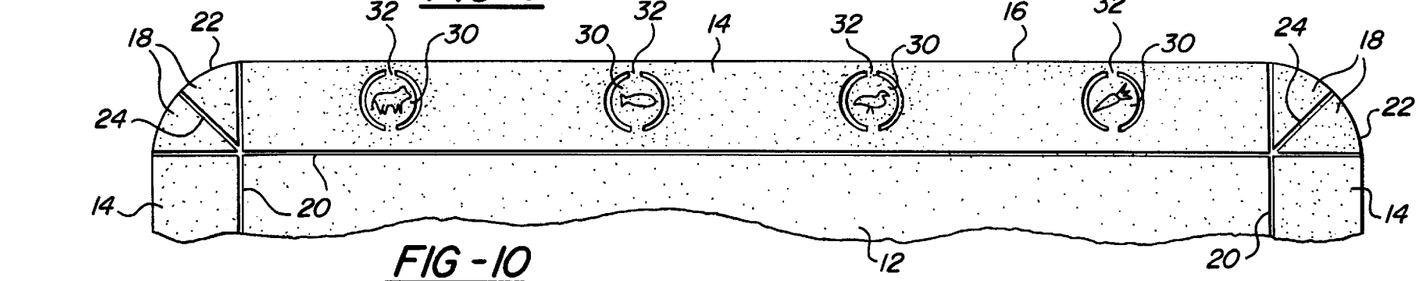
FIG. 10 is an alternative view of the indicia.
Figure 11:
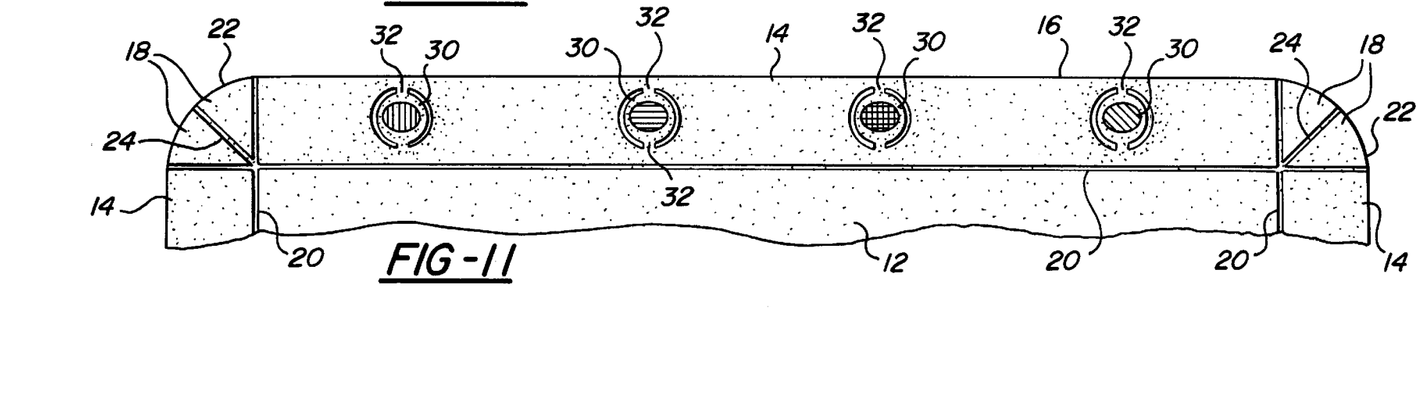
FIG. 11 is another alternative view of the indicia.

To prevent potential cross-contamination, the panel 30 and indicia operate to signal to the user of the cutting board 10 of what type of food product is to be cut on that particular cutting board 10. The specific different indicia or messages may be any suitable word, letter, symbol or color as desired. FIGS. 1, 6 and 9 disclose a single letter designation, letter M for meat, letter F for fish, letter P for poultry, and letter V for vegetable. FIG. 10 discloses different symbol designations, i.e., meat, fish, poultry, and vegetables and FIG. 11 discloses different color designations, i.e., red, blue, yellow, and green.

As shown in FIGS. 2 through 5A, the method of creating the transport tray 10 from the disposable cutting board 10 is shown in greater detail. As discussed above, the cutting board 10 has an inner cutting surface 12, a plurality of outer borders 14, a plurality of corners 18, and a plurality of peripheral score lines 20 separating the inner cutting surface 12 from each of the adjacent outer borders 14. The method of creating the transport tray 10 comprises the steps of; folding a first outer border 14 along its adjacent score line 20 from a substantially horizontal position to a substantially vertical position; folding a second outer border 14 along its adjacent score line 20 from a substantially horizontal position to a substantially vertical position; and manipulating a corner 18 between the first and second outer borders 14 such that the corner 18 and first and second outer borders 14 create an impervious and continuous upstanding wall surrounding the inner cutting surface 12.

The manipulating of the corner 18 is further defined as folding the corner 18 along an adjacent peripheral score line 20. Specifically, the corner 18 is simultaneously folded along the corner score line 24 and the adjacent peripheral score lines 20. As appreciated, the steps of folding the outer borders 14 and the corners 18 may be accomplished in any order or any manner without deviating from the scope of the subject invention.

Figure 4:
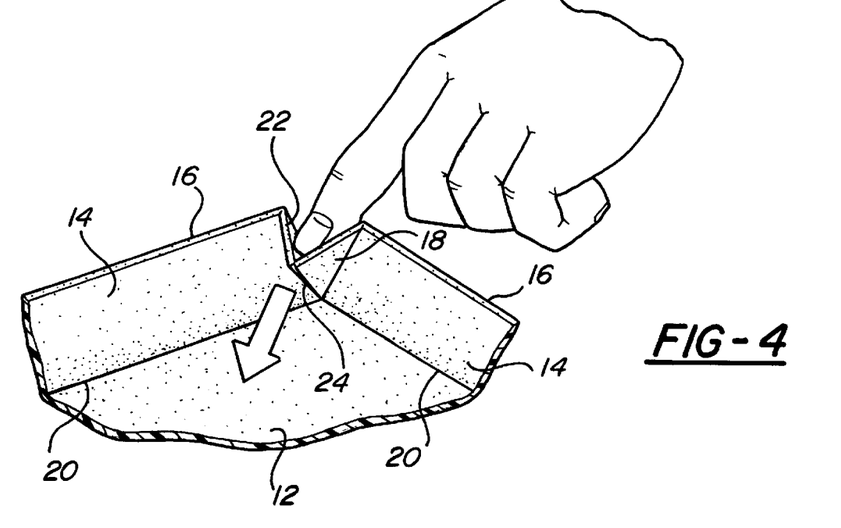
FIG. 4 is a partially cross-sectional perspective view of a user manipulating a corner of the subject invention.
Figures 5, 5A:
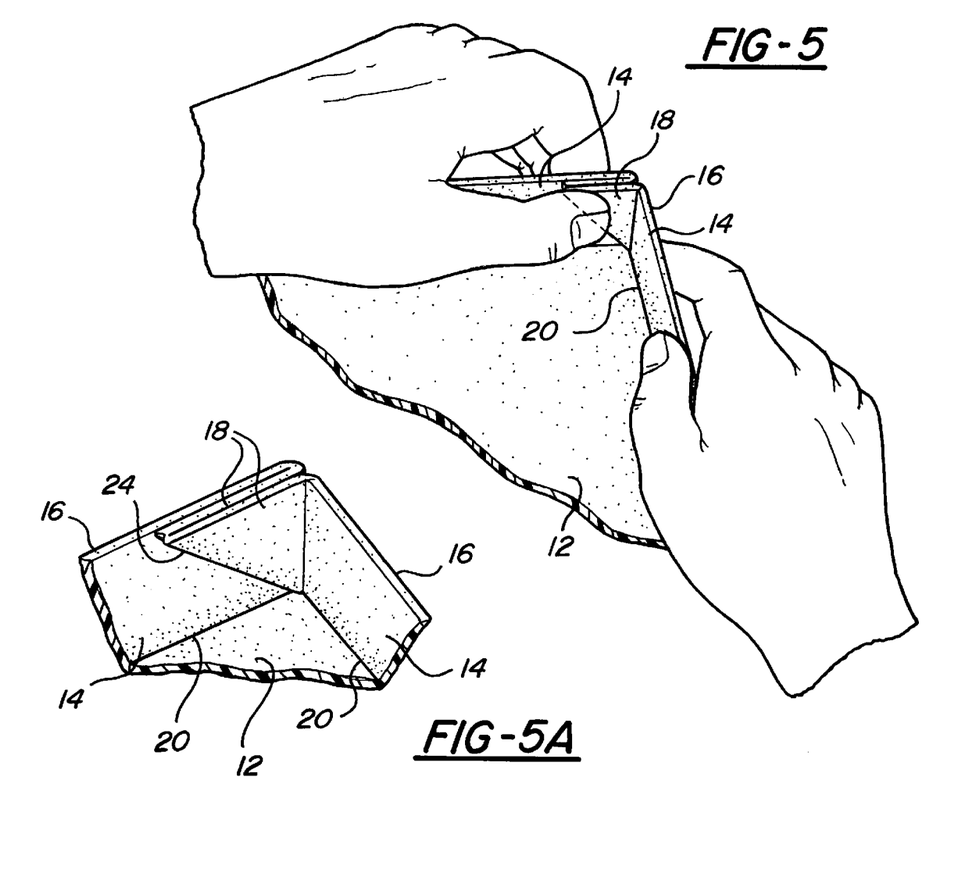
FIG. 5 is a partially cross-sectional perspective view of a user folding the corner against one of the outer borders.
FIG. 5A is an exploded cross-sectional perspective view of the corner shown in FIG. 5.
Figure 6:
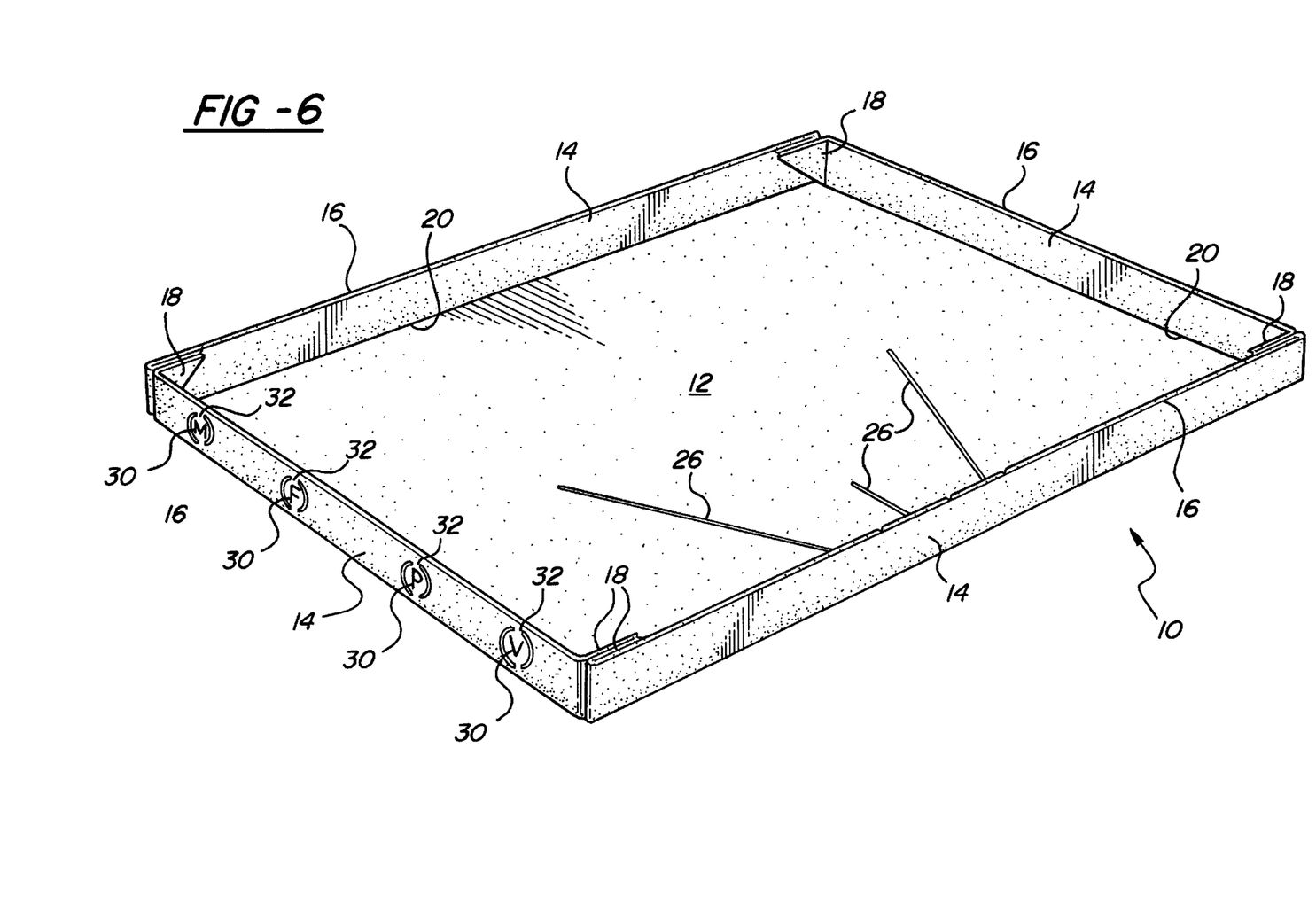
FIG. 6 is a perspective view of the subject invention with the borders and corners folded to contain juices and create a transportable serving tray.

As shown in the preferred embodiment of FIGS. 4, 5, and 5A, the manipulation of the corner 18 is further defined as abutting the corner 18 against an inside surface of one of the first or second outer borders 14 when the first or second outer border 14 is in the substantially vertical position thereby forming the upstanding wall section created by the first and second outer borders 14 and the adjacent corner 18. As clearly shown, the corner 18 is folded inwardly toward the inner cutting surface 12. This particular design is preferred because the corner 18 is disposed within the interior of the transport tray 10 which assists in retaining any food product and/or liquids within the inner cutting surface 12.

As anticipated, a user will typically fold each corner 18 in turn after the outer borders 14 have been folded. In other words, a user may fold two of the outer borders 14 and then fold the adjacent corner 18. The user may then fold the other two outer borders 14 and then fold the remaining three corners 18 to complete the transport tray 10 as shown in FIG. 6. As discussed above, the user may fold the outer borders 14 and corners 18 in any desired order or fashion so long as the outer borders 14 and corners 18 are substantially vertical.

Figure 7:
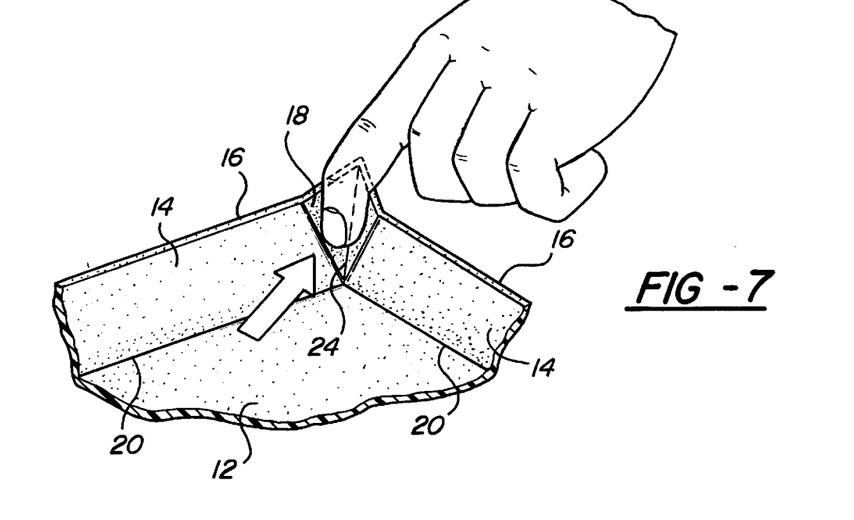
FIG. 7 is a partially cross-sectional perspective view of an alternative method to manipulate the corner.
Figures 8, 8A:
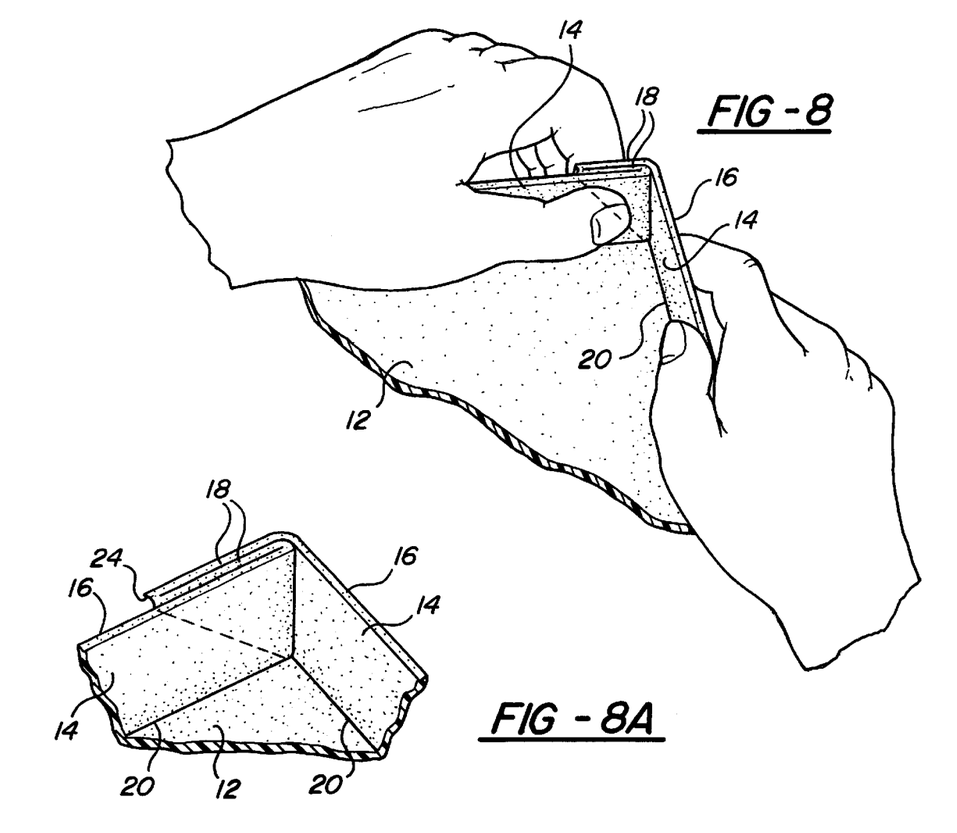
FIG. 8 is a partially cross-sectional perspective view of an alternative method of folding the corner against one of the outer borders.
FIG. 8A is an exploded partially cross-sectional perspective view of the alternative configuration of the corner of FIG. 8.

One alternative method of folding the corners 18 is shown in FIGS. 7, 8 and 8A. The manipulating of the corner 18 is further defined as abutting the corner 18 against an outside surface of one of the first or second outer borders 14 when the first or second outer border 14 is in the substantially vertical position thereby forming the upstanding wall section created by the first and second outer borders 14 and the adjacent corner 18. In other words, the corner 18 is folded outwardly away from the inner cutting surface 12.

As shown in FIG. 7, a door dispenser 34 is shown for removably retaining a plurality of the cutting boards 10 (shown in phantom). The door dispenser 34 is fixedly secured to the internal surface of a cabinet door 36 or the like. A number of cutting boards 10 are placed within the door dispenser 34 for selective removal by the user.

Figure 14:
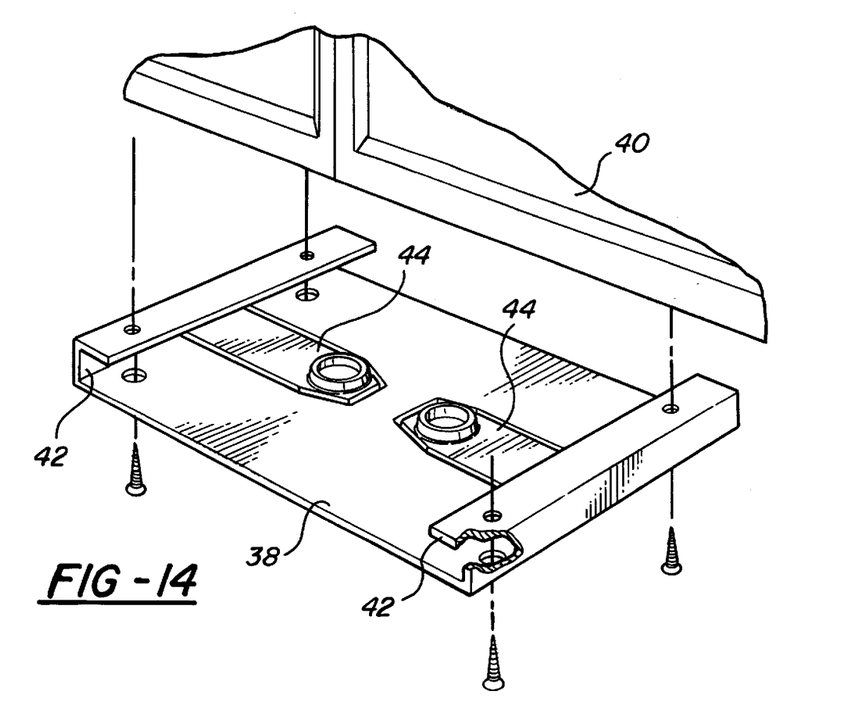
FIG. 14 is a perspective view of a cabinet dispenser.
Figure 15:
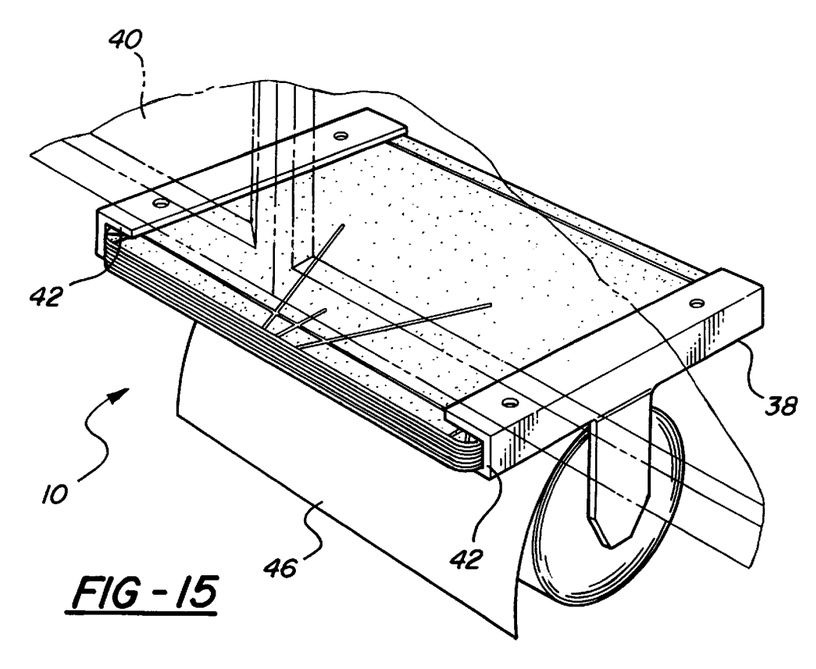
FIG. 15 is a perspective view of the cabinet dispenser retaining the subject invention.

FIGS. 14 and 15, disclose a cabinet dispenser 38 for removably retaining the cutting boards 10. The cabinet dispenser 38 is mounted to an under side surface of a cabinet 40 or the like. The cabinet dispenser 38 includes a pair of integral slots 42 and a pair of pivotable arms 44. The arms 44 may remain within the cabinet dispenser 38 as shown in FIG. 14 or may pivot downwardly to retain a roll of paper towels 46 as shown in FIG. 15. A number of cutting boards 10 are placed within the slots 42 for selective removal by the user.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A disposable cutting board assembly comprising:
    an inner cutting area,
    a plurality of peripheral outer borders extending from said inner cutting area to an exterior edge,
    said inner cutting area and said peripheral outer borders having a top surface and a bottom surface, and
    said assembly characterized by at least one die cut panel disposed along at least one of said outer borders and spaced from a respective exterior edge, an indicia disposed on said bottom surface of said panel, with said panel at least partially concealing said indicia from a user and being manipulatable to convey said indicia to the user of said cutting board assembly.

2. The assembly as set forth in claim 1 wherein said panel is substantially circular and is cut within said corresponding outer border to define a living a hinge portion for retaining said panel within said outer border.

3. The assembly as set forth in claim 1 further characterized by a plurality of peripheral score lines separating said outer borders from said inner cutting area.

4. The assembly as set forth in claim 3 further including a plurality of corners interconnecting said outer borders with said outer borders and said corners foldable between a first position with said outer borders and said corners in a substantially horizontal position and a second position with said outer borders and said corners in a substantially vertical position to create an impervious and continuous exterior wall surrounding said inner cutting surface with said exterior edge defining a top of said continues exterior wall and wherein said borders and said corners may be unfolded to return to said first position.

5. The assembly as set forth in claim 4 further including a coating of plastic disposed on said top surfaces of said inner cutting area, said outer borders and said corners for providing a sterile durable surface, said coating of plastic extending over said top surfaces and terminating at said exterior edge such that said top surfaces and said coating are co-extensive to maintain said bottom surfaces free of said coating.

6. The assembly as set forth in claim 5 wherein said coating of plastic is disposed over said top surface of said panel.

7. The assembly as set forth in claim 6 wherein said peripheral score lines extend substantially parallel with said exterior edge of said outer borders such that said outer borders have a substantially uniform width.

8. The assembly as set forth in claim 7 wherein said inner cutting area is substantially rectangular.

9. The assembly as set forth in claim 8 wherein said outer borders extend along each side of said substantially rectangular inner cutting area such that said outer borders are also substantially rectangular to provide an adequate surface area for said die cut panel.

10. The assembly as set forth in claim 9 wherein said inner cutting area, said peripheral outer borders, and said corners are integrally formed of a single homogeneous cutresistant sheet of paper material.

11. The assembly as set forth in claim 10 further characterized by at least one internal score line extending at least partially through said inner cutting area and into one of said outer borders to said exterior edge for bending said inner cutting area of said cutting board assembly along said internal score line.

12. The assembly as set forth in claim 11 wherein said internal score line intersects at least one of said peripheral score lines.

13. The assembly as set forth in claim 1 further including four die cut panels disposed along one of said outer borders with a different indicia disposed on said bottom surface of each of said panels to convey different messages to the user of said cutting board assembly.

14. A disposable cutting board assembly comprising:

a homogeneous sheet of cut-resistant paper material having an inner cutting area;

a plurality of peripheral outer borders and a plurality of corners extending from said inner cutting area to an endless exterior edge;

said inner cutting area, said outer borders and said corners each having a top surface and a bottom surface;

a coating of plastic disposed on said top surfaces of said inner cutting area, said outer borders and said corners of said homogeneous sheet of paper material for providing a sterile durable surface to prevent liquid absorption into said sheet of paper material and to reduce cross contamination;

said coating of plastic extending over said top surfaces and terminating at said exterior edge such that said top surfaces and said coating are co-extensive to maintain said bottom surfaces and said exterior edge free of said coating; and a plurality of peripheral score lines separating said outer borders from said inner cutting area, said outer borders and said corners foldable between a first position with said outer borders and said corners in a substantially horizontal position and a second position with said outer borders and said corners in a substantially vertical position to create an impervious and continuous exterior wall surrounding said inner cutting area with said endless exterior edge defining a top of said continuous exterior wall and wherein said borders and said corners may be unfolded to return to said first position.

15. The assembly as set forth in claim 14 wherein said peripheral score lines separate said corners from said outer borders and said inner cutting area.

16. The assembly as set forth in claim 14 wherein said peripheral score lines extend substantially parallel with said exterior edge of said outer borders such that said outer borders have a substantially uniform width.

17. The assembly as set forth in claim 16 wherein said inner cutting area is substantially rectangular.

18. The assembly as set forth in claim 17 wherein said outer borders extend along each side of said substantially rectangular inner cutting area such that said outer borders are also substantially rectangular.

19. The assembly as set forth in claim 18 wherein said corners interconnect said outer borders.

20. The assembly as set forth in claim 19 wherein each of said corners include a curved exterior edge.

21. The assembly as set forth in claim 20 further characterized by a corner score line extending from said inner cutting area through a center of each of said corners to said curved exterior edge.

22. The assembly as set forth in claim 14 further characterized by at least one internal score line extending at least partially through said inner cutting area and into one of said outer borders to said exterior edge for bending said inner, cutting area of said cutting board assembly along said internal score line.

23. The assembly as set forth in claim 22 wherein said internal score line intersects at least one of said peripheral score lines.

24. The assembly as set forth in claim 14 further characterized by at least one die cut panel disposed along at least one of said outer borders and spaced from a respective exterior edge, an indicia disposed on said bottom surface of said panel, with said panel at least partially concealing said indicia from a user and being manipulatable to convey said indicia to the user of said cutting board assembly.

25. The assembly as set forth in claim 14 further characterized by a dispenser for removeably retaining a plurality of said cutting board assemblies.

26. The assembly as set forth in claim 14 wherein said coating of plastic is further defined as a polyethylene coating.

* * * * *